(12) United States Patent
Kim

(10) Patent No.: US 8,363,053 B2
(45) Date of Patent: Jan. 29, 2013

(54) METHOD AND APPARATUS FOR RENDERING OUTLINE OF MULTIMEDIA CHARACTER IMAGE

(75) Inventor: David Bosik Kim, Seoul (KR)

(73) Assignee: Mwstory Co., Ltd., Seoul (KR)

( * ) Notice: Subject to any disclaimer, the term of this patent is extended or adjusted under 35 U.S.C. 154(b) by 792 days.

(21) Appl. No.: 12/569,728

(22) Filed: Sep. 29, 2009

(65) Prior Publication Data

US 2010/0277482 A1    Nov. 4, 2010

(30) Foreign Application Priority Data

Apr. 29, 2009    (KR) .................. 10-2009-0037875

(51) Int. Cl.
  *G06T 15/50* (2011.01)
  *G06T 11/20* (2006.01)
  *G09G 5/00* (2006.01)
(52) U.S. Cl. .................. 345/426; 345/581; 345/441
(58) Field of Classification Search .................. None
  See application file for complete search history.

(56) References Cited

U.S. PATENT DOCUMENTS

| | | | | |
|---|---|---|---|---|
| 5,767,857 A | * | 6/1998 | Neely | 345/427 |
| 5,847,712 A | * | 12/1998 | Salesin et al. | 345/582 |
| 5,966,134 A | * | 10/1999 | Arias | 345/589 |
| 6,762,759 B1 | * | 7/2004 | Lake et al. | 345/426 |

FOREIGN PATENT DOCUMENTS

| | | |
|---|---|---|
| JP | 2002-063596 | 2/2002 |
| JP | 2003-123096 | 4/2003 |
| JP | 2007-026111 | 2/2007 |
| KR | 10-2008-0051008 | 6/2008 |

* cited by examiner

*Primary Examiner* — Ryan R Yang
(74) *Attorney, Agent, or Firm* — Bryan Cave LLP

(57) ABSTRACT

Disclosed are a method and an apparatus for rendering outlines of multimedia character images for rendering the outlines. The method consists of: (a) detecting parameter values that include a screen width, a two-dimensional screen point, a three-dimensional view point, and a field of view on both ends of the screen width from a position of a user, which are associated with the character to be displayed on the screen from the driven multimedia contents; (b) calculating positional information on an x-axis direction of the character for a two-dimensional screen, on which the character is displayed, based on the parameter values; (c) calculating outline thickness factor of the character in three dimensions, based on the positional information of the x-axis direction of the character on the two-dimensional screen; and (d) performing and processing an outline rendering on the character based on the calculated outline thickness.

5 Claims, 5 Drawing Sheets

METHOD AND APPARATUS FOR RENDERING OUTLINE OF MULTIMEDIA CHARACTER IMAGE

This application claims priority to Korean Patent Application No. 10-2009-0037875, filed on Apr. 29, 2009, in the Korean Intellectual Property Office, the entire contents of which are hereby incorporated by reference.

BACKGROUND OF THE INVENTION

1. Field of the Invention

The present invention relates to a method and an apparatus for rendering outlines of multimedia character images, and more specifically, to a method and an apparatus for rendering outlines of multimedia character images for rendering the outlines so as to display, as three-dimensional images, two-dimensional character images appearing when executing multimedia contents such as a game.

2. Description of the Related Art

In effort to display characters as a neat and sweet 3D graphic by representing the characters in a carton style in multimedia contents such as a recently launched game much research has been undertaken. When the outlines are given to the characters appearing according to the execution of the multimedia contents, lines of static or dynamic images are neatly and sweetly treated, such that a viewer can expect to more lively and feelingly use the images. A technology of giving the outlines to the characters is said to be a rendering technology and a type of characters produced by the rendering technology is said to be a carton style.

The rendering technology is said to be a process of feelingly producing the three-dimensional images while considering a shadow, a color tone, a depth, etc., differently displayed on the two-dimensional picture a according to the external information such as a shape, a position, lighting, etc., or a technology of implementing the process. In other words, the rendering is a processing of a computer graphic that changes a shadow, a depth, etc., of a two-dimensionally viewed object to give a three-dimensional effect to the object and adds to the actual sensation of the object. The rendering technology corresponds to a final step when two-dimensional or three-dimensional graphics images are prepared. Generally, in the two-dimensional graphics, the rendering technology indicates a final image processing technology that generates completed images and in the three-dimensional graphics, the rendering technology indicates making model data, which are recorded in a computer, in the form of images so that the model data are described on a display device. The simplest rendering method may include, for example, a wireframe rendering that describes only edges of an object. Further, the most used basic rendering method may include, for example, a raytracing rendering. This is a rendering method that determines color tones of each pixel by a process of reversely tracking a path to a light source from which rays start by calculating the refraction, reflection, etc., of rays. In addition, when rays are randomly reflected, there is a radiosity rendering, etc., that performs rendering while comprehensively considering the relation with other peripheral objects.

Generally, when deriving the outline of the cartoon style, a general method first draws a slight larger black image and then draws an object to be covered thereon, so as to give an outline around the object. Another known method is a method that recalculates positions of all apexes of the outline. For all apexes of the outline, a polygon is generated every time by increasing in a normal vector direction of the apex bit by bit. This method can easily solve an anti-aliasing. However, since this method consumes a lot of resources of a central processing unit (CPU), it has a problem in that a speed of a computer is slow.

The above-mentioned existing rendering methods allocate a lot of CPU resources to make the speed of the computer slow as the outline shape size of the character to be drawn is getting larger.

FIG. 1 is a diagram showing an example where images obtained by performing a rendering processing on characters displayed by executing multimedia contents are displayed on a screen.

The known rendering technologies generally render the outlines of the characters at a uniform thickness without considering a distance of a three-dimensionally displayed character. Therefore, as shown the figure, when the characters are rendered by the known methods, the known methods do not cause any problem for the characters arranged at a close distance, but cannot identify the rendered outlines and can unevenly render the outlines according to the precision of the rendering processing, for the characters arranged at a far distance.

SUMMARY OF THE INVENTION

The present invention proposes to solve the above problems. It is an object of the present invention to provide a method and apparatus for rendering outlines of multimedia character images capable of minimizing a load of a computer in rendering outlines of characters appearing when multimedia contents are executed.

It is another object of the present invention to provide a method and apparatus for rendering outlines of multimedia character images capable of uniformly drawing outlines to easily identify rendering while considering a size of a character or a position (distance) on a display, in rendering outlines of a characters appearing when multimedia contents are executed.

In order to achieve the above objects, there is provided a method for rendering outlines of characters of multimedia contents by a controller included in a computer according to an aspect of the present invention comprising: (a) detecting parameter values for deriving the outlines of the characters that include a screen width (SW), a two-dimensional screen point (SP), a three-dimensional view point (VP), and a field of view (fov) on both ends of the screen width (SW) from a position of a user, which are associated with the characters to be displayed on the screen from the driven multimedia contents; (b) when thickness information (TH) on established two-dimensional outlines is input to the characters, calculating positional information (SPx) on an x-axis direction of the characters for a two-dimensional screen, on which the characters are displayed, based on the parameter values; (c) calculating outline thickness factor (SF) of the characters in three dimensions, based on the positional information (SPx) of the x-axis direction of the characters on the two-dimensional screen, positional information (VPx) in an x-axis direction of the characters for a three-dimensional spatial coordinate, and the outline thickness information (TH) of the character in two dimensions; and (d) performing and processing an outline rendering on the characters based on the calculated outline thickness factor (SF) and outputting it on the screen.

According to one embodiment of the present invention, in step (b), the positional information (SPx) in the x-axis direction of the characters on the two-dimensional screen, on which the characters are displayed, is calculated using Equation $$SP \cdot x = VP \cdot x \times \frac{\cot\left(\frac{fov_w}{2}\right)}{VP \cdot z} \times \frac{SW}{2};$$

wherein, SP is the positional information of the character apexes in the screen space (two dimension), SPx is the positional information in the x-axis direction of an object on the two-dimensional screen, VP is the positional information of the character apexes in a camera (the position of the user) space (three dimension), VPx is the positional information in the x-axis direction of the characters on the three-dimensional spatial coordinate, VPz is distance (depth) information to the character on the three-dimensional spatial coordinate, fov is the field of view of an area that can be rendered on the screen by the camera, w, which is an abbreviated word for a width, means an angle represented based on the width, and SW is the screen width of the character to be displayed on the screen.

According to one embodiment of the present invention, in step (c), the outline thickness factor (SF) of the characters in three dimensions is calculated using Equation $$SF = TH \times \frac{VP \cdot x}{SP \cdot x} = TH \times \frac{VP \cdot z \times 2}{\cot\left(\frac{fov_w}{2}\right) \times SW};$$

wherein, SF is the outline thickness factor (screen factor) of the characters in the camera space (three dimension), TH is the outline thickness of the character in the screen space (two dimension), VP is the positional information of the character apexes in the screen space (three dimension), VPx is the positional information in the x-axis direction of the characters in the three-dimensional spatial coordinate, SP is the positional information of the character apexes in the screen space (two dimension), SPx is the positional information in the x-axis direction on the two-dimensional screen, VPz is distance (depth) information to the character in the three-dimensional spatial coordinate, fov is the field of view of an area that can be rendered on the screen by the camera, w, which is an abbreviated word for a width, means an angle represented based on the width, and SW is the screen width of the character to be displayed on the screen.

According to one embodiment of the present invention, in step (d), the outline rendering on the characters based on the outline thickness factor (SF) is linearly performed and processed.

In order to achieve the above objects, there is provided an apparatus for rendering outlines of characters of multimedia contents according to another aspect of the present invention comprising: a controller that detects parameter values for deriving the outlines of the characters that include a screen width (SW), a two-dimensional screen point (SP), a three-dimensional view point (VP), and a field of view (fov) viewable on the screen based on a position of a user from the screen width (SW), which are associated with the character to be displayed on the screen from the driven multimedia contents; when thickness information (TH) of established two-dimensional outlines are input to the characters, a screen height calculator that calculates positional information (SPx) in an x-axis direction of the characters for a two-dimensional screen, on which the characters are displayed, based on the parameter values; a screen factor calculator that calculates outline thickness factor (SF) of the character in three dimensions, based on the positional information (SPx) in the x-axis direction of the characters on the two-dimensional screen, positional information (VPx) in an x-axis direction of the characters for a three-dimensional spatial coordinate, and the outline thickness information (TH) of the character in two dimensions; and a rendering unit that performs and processes an outline rendering on the characters based on the calculated outline thickness factor (SF). At this time, the controller outputs the characters, which are subjected to the outline rendering processing, to the screen.

The present invention calculates the screen factors of the characters to be displayed in three dimensions when processing of the multimedia contents is performed and processes the rendering lines of the characters along a line based on the calculated factors and outputs them to the screen, making it possible to minimize the load of the computer by performing the outline rendering on the characters and to draw the outlines having the uniform thickness to facilitate the rendering identification by considering the size of the character or the position (distance) of the character on the screen.

BRIEF DESCRIPTION OF THE DRAWINGS

These and other objects, features, aspects, and advantages of the present invention will be more fully described in the following detailed description of preferred embodiments and examples, taken in conjunction with the accompanying drawings. In the drawings.

DETAILED DESCRIPTION OF THE INVENTION

Figure 1:
FIG. 1 is a diagram showing an example where images obtained by performing a rendering processing on characters displayed by executing multimedia contents are displayed on a screen.

Hereinafter, preferred embodiments of the present invention will be described in detail with reference to the accompanying drawings. It should be noted that like reference numerals refer to like components throughout the drawings. In addition, the detailed description of a related known function or configuration that may make the purpose of the present invention unnecessarily ambiguous in describing the present invention will be omitted.

The present invention discloses a method capable of drawing a predetermined outline according to a size of multimedia characters or a position (distance) of the multimedia characters on a screen and controlling a thickness of an outline as desired.

Figure 2:
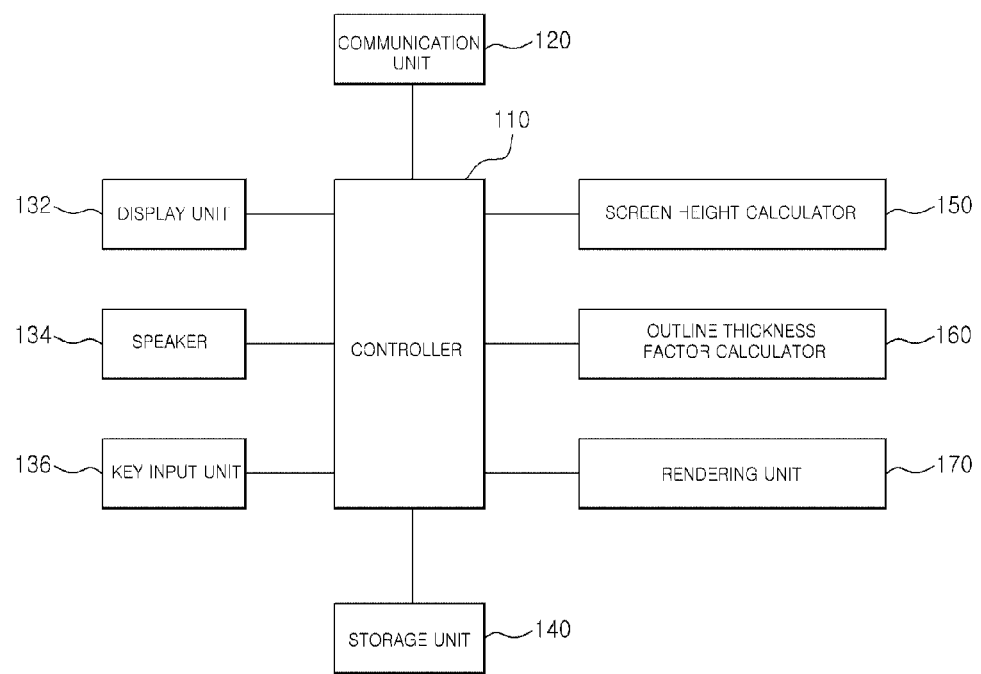
FIG. 2 is a block diagram showing a configuration of an apparatus for rendering outlines of multimedia characters according to a preferred embodiment of the present invention.
Figure 4:
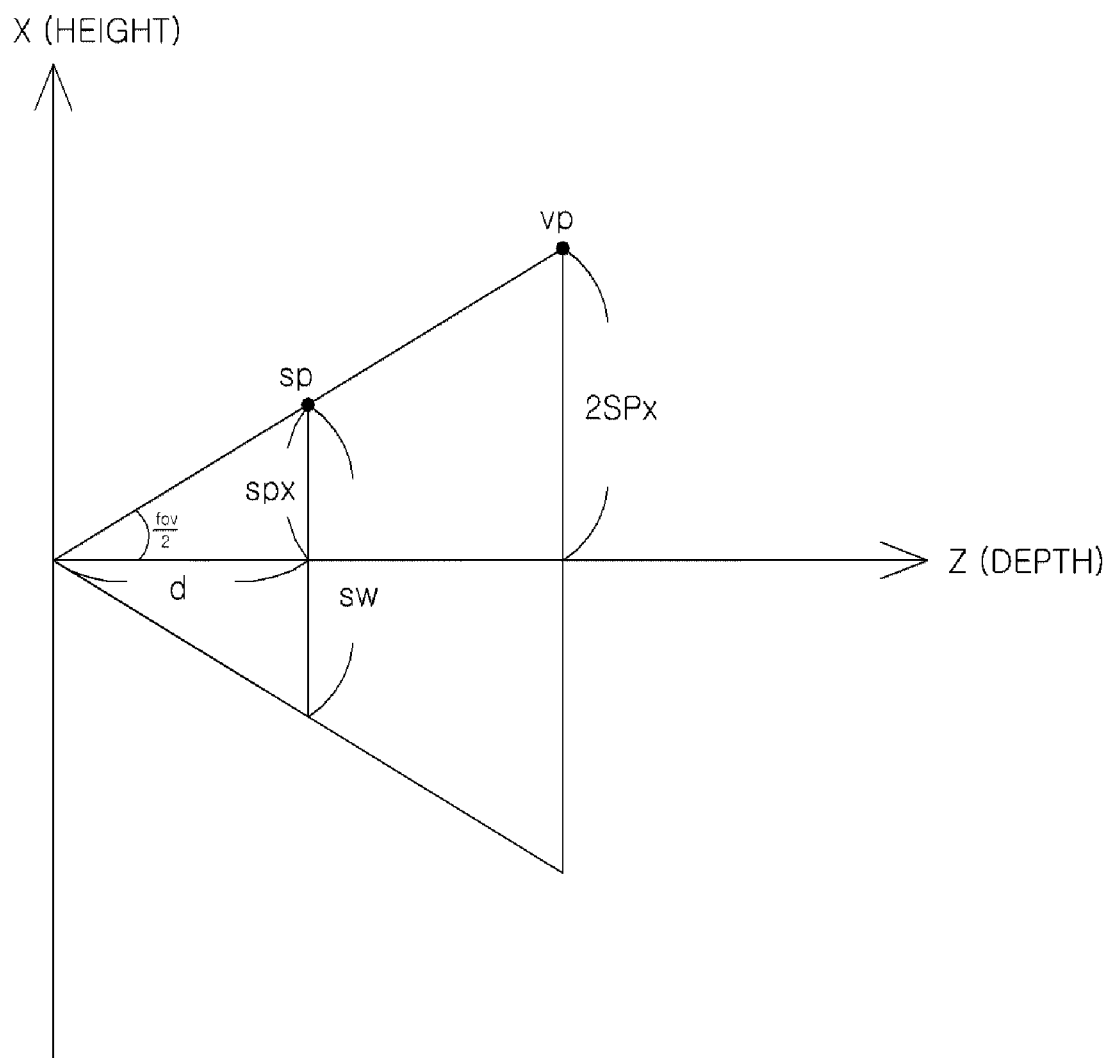
FIG. 4 is a diagram showing a process for deriving screen factors of characters on a screen, on which the characters are displayed, according to the execution of multimedia contents according to an embodiment of the present invention.

FIG. 2 is a block diagram showing a configuration of an apparatus for rendering outlines of multimedia characters according to a preferred embodiment of the present invention. FIG. 4 is a diagram showing a process for deriving screen factors of characters on a screen, on which the characters are displayed, according to the execution of multimedia contents according to an embodiment of the present invention.

As shown, an apparatus for rendering multimedia characters is configured to include a controller 110, a communication unit 120, a display unit 132, a speaker 134, a key input unit 136, a storage unit 140, a screen height calculator 150, a screen factor calculator 160, and a rendering unit 170.

The controller 110 controls the overall operations of an apparatus for rendering outlines of multimedia characters and controls a rendering operation of characters to be displayed according to the driving of the multimedia contents according to the embodiment of the present invention.

The communication unit 120 transmits and receives multimedia contents through an online communication network such as the Internet.

The display unit 132 displays the execution result information of the multimedia contents provided through the online communication network according to the control of the controller 110. In addition, the display unit 132 displays images obtained by performing the rendering processing on the characters appearing on the executed multimedia contents according to the embodiment of the present invention.

The speaker 134 outputs audio information generated according to the execution result of the multimedia contents.

The key input unit 136 includes keys for inputting operation control instructions of the rendering processed characters displayed according to the execution instruction and execution result of the multimedia contents.

The storage unit 140 stores an execution program of the multimedia contents according to the embodiment of the present invention, a program for performing the rendering processing on the characters appearing according to the execution of the multimedia contents, the rendering processed character image information, etc.

The screen height calculator 150 calculates positional information (SPx) in an x-axis direction of a character on a two-dimensional screen, on which characters are displayed, according to the execution of the multimedia contents. To this end, as shown in FIG. 4, the controller 110 detects a screen width (SW), a two-dimensional screen point (SP), a three-dimensional view point (VP), and a field of view (fov) on both ends of the screen width (SW) from a position of a user, which are associated with the characters to be displayed on the screen from the driven multimedia contents. At this time, the controller 110 receives thickness information (TH) on outlines for establishing to the characters input from the key input unit 136 by a user. At this time, the outline thickness information (TH) on the input characters is information that does not consider a distance (d) to a screen from a position of a user. For reference, in the character shown in FIG. 4, an x-axis is a height, a z-axis is a depth, an intersection point of the x-axis and z-axis is a point where the user is positioned or the camera is positioned.

As a result, the screen height calculator 150 uses parameter values (SW, SP, VP, and fov) for deriving the above-mentioned outlines of characters to calculate the positional information (SPx) in the x-axis direction of the characters on the screen, on which the characters are displayed, according to the execution of the multimedia contents through the following Equation 1.

$$SP \cdot x = VP \cdot x \times \frac{\cot\left(\frac{fov_w}{2}\right)}{VP \cdot z} \times \frac{SW}{2} \quad \text{(Equation 1)}$$

Wherein, SP is the positional information of the character apex in the screen space (two dimension), SPx is the positional information of the x-axis direction of an object on the two-dimensional screen, VP is the positional information of the character apex in a camera (the position of the user) space (three dimension), VPx is the positional information of the x-axis direction of the characters in the three-dimensional spatial coordinate, VPz is distance (depth) information to the character in the three-dimensional spatial coordinate, fov is the angle information of an area that can be rendered on the screen by the camera, w, which is an abbreviated word for a width, means an angle represented based on the width, and SW is the screen width of the character to be displayed on the screen.

The screen factor calculator 160 calculates screen factors (SFs), which are numerical values of the outline thickness determining the three-dimensional outline thickness on the screen, by using the following Equation 2 based on the positional information (SPx) of the x-axis direction of the characters calculated by the screen height calculator 150. At this time, the screen factor (SF) is a value that considers the distance information (d) to the character.

$$SF = TH \times \frac{VP \cdot x}{SP \cdot x} = TH \times \frac{VP \cdot z \times 2}{\cot\left(\frac{fov_w}{2}\right) \times SW} \quad \text{(Equation 2)}$$

Where SP is the screen factor of the character in the camera space (three dimension), TH is the outline thickness of the character in the screen space (two dimension), VP is the positional information of the character apex in the screen space (three dimension), VPx is the positional information of the x-axis direction of the characters in the three-dimensional spatial coordinate, SP is the positional information of the character apex in the screen space (two dimension), SPx is the positional information of the x-axis direction on the two-dimensional screen, VPz is distance (depth) information to the character in the three-dimensional spatial coordinate, fov is the angle information of an area that can be rendered on the screen by the camera, w, which is an abbreviated word of a width, means an angle represented based on the width, and SW is the screen width of the character to be displayed on the screen.

The rendering unit 170 performs the rendering on an area expanded in an outside normal direction of the characters along a line by using numerical values corresponding to the three-dimensional screen factors (SFs) of the characters calculated by the screen factor calculator 160 to process the outline rendering on the three-dimensional characters.

Therefore, the method for rendering the outlines of the characters appearing according to the execution of the multimedia contents can minimize the load of the computer as compared to a known method of performing the rendering by expanding the entire area of the character, coloring it black, and then overlapping an original character thereon. In addition, in performing the rendering on the outlines of the characters appearing when the multimedia contents are executed, the rendering can be performed by using the outlines having a predetermined thickness to facilitate the rendering identification while considering the size of the character or the position (distance) to the character on the screen.

Figure 3:
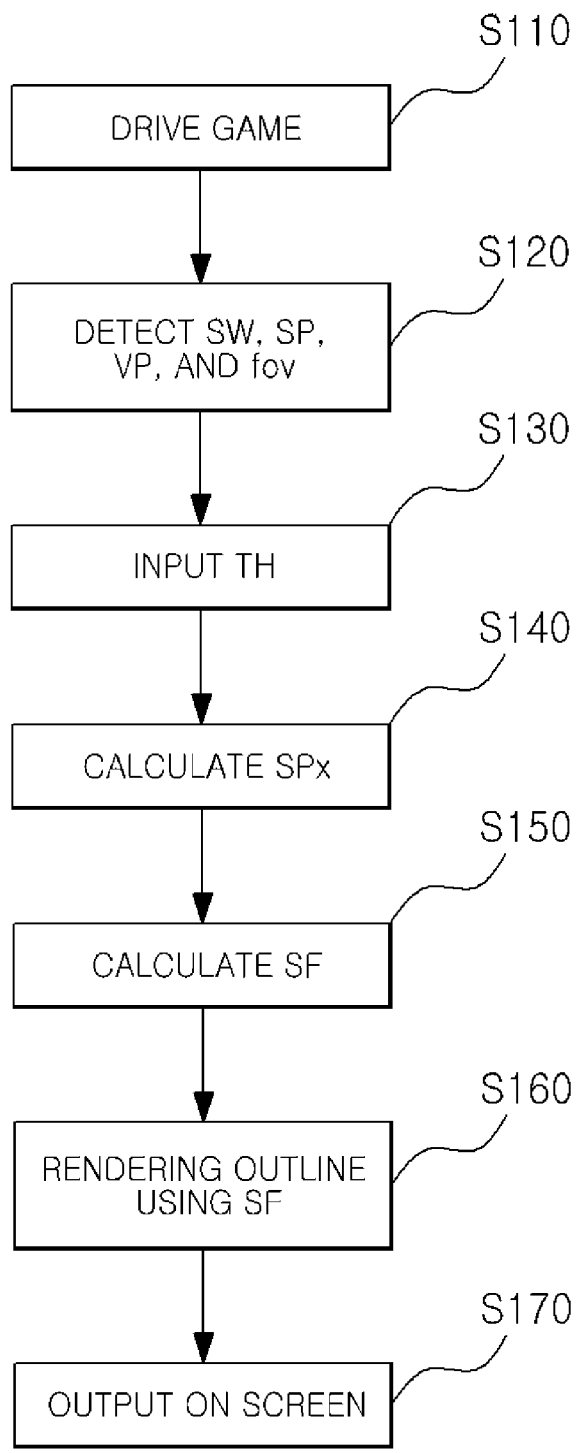
FIG. 3 is a block diagram showing a method for rendering outlines of multimedia characters according to a preferred embodiment of the present invention.

FIG. 3 is a block diagram showing a method for rendering outlines of multimedia characters according to a preferred embodiment of the present invention.

As shown the figure, the controller 110 drives a game through the multimedia contents programs, which are stored in the storage unit 140, according to instructions input from the key input unit 136 (S110).

When the game is driven, prior to displaying the characters on the screen, the controller 110 detects a screen width (SW), a two-dimensional screen point (SP), a three-dimensional view point (VP), and a field of view (fov) that can draw both ends of the screen width (SW) on the screen based on the position of the user, which are associated with the characters to be displayed on the screen from the driven multimedia contents (S120). At this time, the controller 110 receives the thickness information (TH) on the outlines for establishing to the characters input from the key input unit 136 by a user (S130).

Thereafter, the controller 110 performs the outline rendering of the characters based on the factors for deriving the outlines of the detected characters and the input thickness information (TH) as described above. First, the controller 110 uses the screen height calculator 150. The screen height calculator 150 uses parameter values (SW, SP, VP, and fov) for deriving the above-mentioned outlines of characters to calculate the positional information (SPx) in the x-axis direction of the characters on the screen (two dimension), on which the characters are displayed, according to the execution of the multimedia contents through the above Equation 1 (S140).

When the positional information (SPx) in the x-axis direction of the two-dimensional screen of the characters is calculated, the controller 110 controls the screen factor calculator 160 based on the positional information (SPx) in the x-axis direction of the calculated two-dimensional screen to calculate the screen factors (SFs), which are numerical values of the outline thickness determining the three-dimensional outline thickness on the screen, using the above Equation 2 (S150).

Therefore, the controller 110 controls the rendering unit 170 to perform and process the outline rendering of the characters based on the screen factors (SFs) of the calculated characters (S 160). The controller 110 outputs the characters, which are subjected to the outline rendering, on the screen through the display unit 132 (S170).

Figure 5:
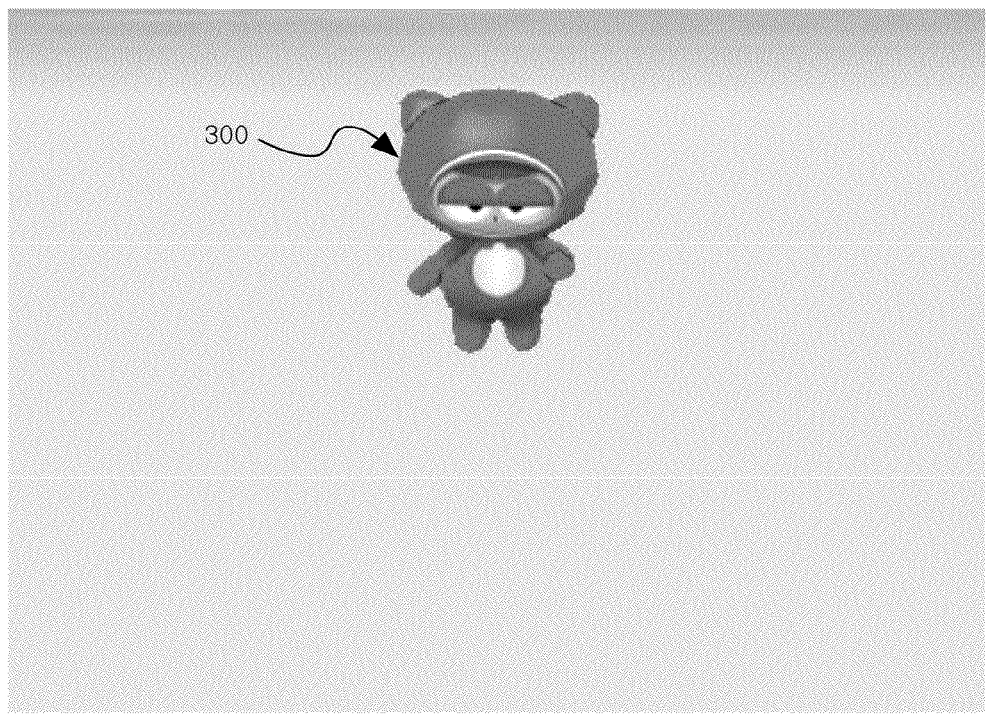
FIG. 5 is a diagram showing an example of characters displayed on a screen according to the execution of multimedia contents.
Figure 6:
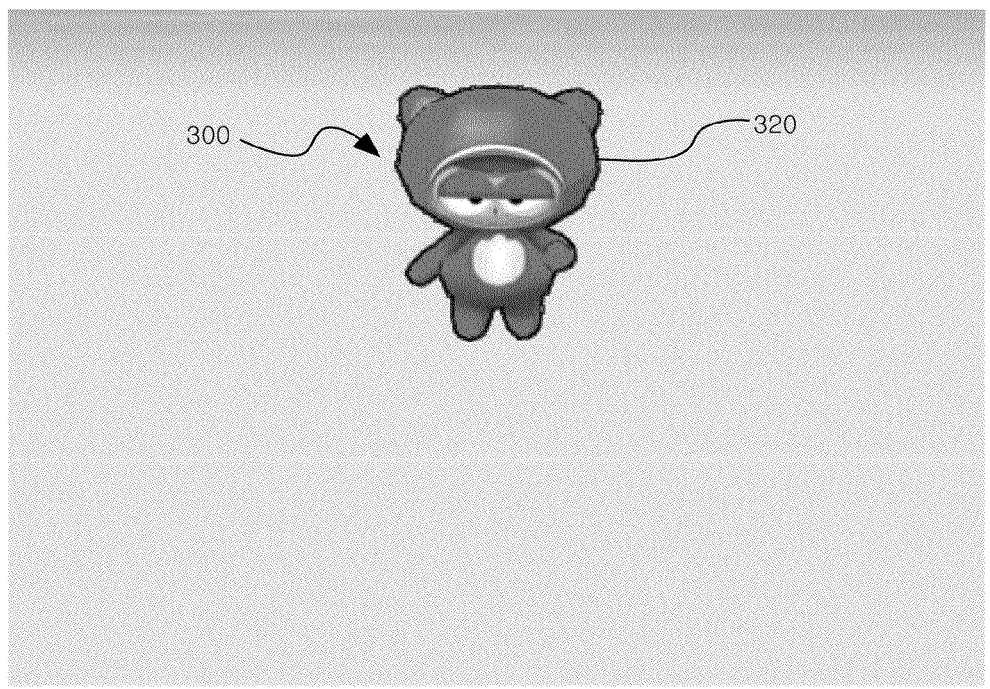
FIG. 6 is a diagram showing characters displayed on a screen in the state of rendering the outlines of the characters of FIG. 5 according to the embodiment of the present invention.

FIG. 5 is a diagram showing an example of characters displayed on a screen according to the execution of multimedia contents and FIG. 6 is a diagram showing characters displayed on a screen in the state of rendering the outlines of the characters of FIG. 5 according to the embodiment of the present invention.

As shown in figures, it can be appreciated that a character 300 obtained by performing the rendering on an outline of the character to be displayed depending on the execution of the multimedia contents in accordance with the present invention has a uniform thickness along an outer surface of the character and the outline 320 of the character 300 is subjected to the rendering.

While the present invention has been described with reference to the preferred embodiments, it will be understood by those skilled in the related art that various modifications and variations may be made therein without departing from the scope of the present invention as defined by the appended claims.

What is claimed is:

1. A method for rendering outlines of characters of multimedia contents by a controller included in a computer comprising:

(a) detecting parameter values for deriving the outlines of the characters that include a screen width (SW), a two-dimensional screen point (SP), a three-dimensional view point (VP), and a field of view (fov) on both ends of the screen width (SW) from a position of a user, which are associated with the characters to be displayed on the screen from the multimedia contents;

(b) when an outline thickness information (TH) on established two-dimensional outlines is input to the characters, calculating positional information (SPx) on an x-axis direction of the characters for a two-dimensional screen, on which the characters are displayed, based on the parameter values;

(c) calculating an outline thickness factor (SF) of the characters in three dimensions, based on the positional information (SPx) of the x-axis direction of the characters on the two-dimensional screen, positional information (VPx) in an x-axis direction of the characters for a three-dimensional spatial coordinate, and the outline thickness information (TH) of the character in two dimensions; and (d) performing and processing an outline rendering on the characters based on a calculated outline thickness factor (SF) and outputting it on the screen.

2. The method for rendering outlines of characters of multimedia contents according to claim 1, wherein, in step (b), the positional information (SPx) in the x-axis direction of the characters on the two-dimensional screen, on which the characters are displayed, is calculated using Equation $$SP \cdot x = VP \cdot x \times \frac{\cot\left(\frac{fov_w}{2}\right)}{VP \cdot z} \times \frac{SW}{2};$$

wherein, SP is the positional information of a character apexes in the two-dimensional screen, SPx is the positional information in the x-axis direction of an object on the two-dimensional screen, VP is the positional information of the character apexes in a camera (the position of the user) space (three dimension), VPx is the positional information in the x-axis direction of the characters on the three-dimensional spatial coordinate, VPz is distance (depth) information to the character on the three-dimensional spatial coordinate, fov is the field of view of an area that can be rendered on the screen by the camera, w, which is an abbreviated word for a width, means an angle represented based on the width, and SW is the screen width of the character to be displayed on the screen.

3. The method for rendering outlines of characters of multimedia contents according to claim 2, wherein, in step (c), the outline thickness factor (SF) of the characters in three dimensions is calculated using Equation $$SF = TH \times \frac{VP \cdot x}{SP \cdot x} = TH \times \frac{VP \cdot z \times 2}{\cot\left(\frac{fov_w}{2}\right) \times SW};$$

wherein, SF is the outline thickness factor (screen factor) of the characters in a camera space (three dimension), TH is the outline thickness information of the character in the two-dimensional screen, VP is the positional information of the character apexes in the screen space (three dimension), VPx is the positional information in the x-axis direction of the characters in the three-dimensional spatial coordinate, SP is the positional information of the character apexes in the two-dimensional screen, SPx is the positional information in the x-axis direction on the two-dimensional screen, VPz is distance (depth) information to the character in the three-dimensional spatial coordinate, fov is the field of view of an area that can be rendered on the screen by the camera, w, which is an abbreviated word for a width, means an angle represented based on the width, and SW is the screen width of the character to be displayed on the screen.

4. The method for rendering outlines of characters of multimedia contents according to claim 1, wherein, in step (d), the outline rendering on the characters based on the outline thickness factor (SF) is linearly performed and processed.

5. An apparatus for rendering outlines of characters of multimedia contents comprising:
- a controller that detects parameter values for deriving the outlines of the characters that include a screen width (SW), a two-dimensional screen point (SP), a three-dimensional view point (VP), and a field of view (fov) viewable on the screen based on a position of a user from the screen width (SW), which are associated with the character to be displayed on the screen from the multimedia contents;
- when the outline thickness information (TH) of established two-dimensional outlines are input to the characters, a screen height calculator that calculates, positional information (SPx) in an x-axis direction of the characters for a two-dimensional screen, on which the characters are displayed, based on the parameter values;
- a screen factor calculator that calculates an outline thickness factor (SF) of the character in three dimensions, based on the positional information (SPx) in the x-axis direction of the characters on the two-dimensional screen, positional information (VPx) in an x-axis direction of the characters for a three-dimensional spatial coordinate, and an outline thickness information (TH) of the character in two dimensions; and
- a rendering unit that performs and processes an outline rendering on the characters based on a calculated outline thickness factor (SF),
- wherein the controller outputs the characters, which are subjected to the outline rendering processing, to the screen.

* * * * *